United States Patent [19]

Sakuri et al.

[11] 4,010,903
[45] Mar. 8, 1977

[54] NOZZLE FOR INJECTION MOLDING OF THERMOPLASTICS

[75] Inventors: Osamu Sakuri; Toshio Saito; Masanori Kato, all of Tokyo, Japan

[73] Assignee: Torazo Saito, Tokyo, Japan

[22] Filed: Apr. 21, 1975

[21] Appl. No.: 569,928

[30] Foreign Application Priority Data

June 27, 1974 Japan .............................. 49-72764

[52] U.S. Cl. ..................... 239/533.1; 425/245 NS
[51] Int. Cl.² .............................................. B05B 1/30
[58] Field of Search ............ 425/245 NS, DIG. 224, 425/DIG. 225, DIG. 226, DIG. 227; 239/533

[56] References Cited

UNITED STATES PATENTS

| 3,010,156 | 11/1961 | Smith | 425/DIG. 227 |
| 3,023,458 | 3/1962 | Seymour | 425/245 NS |
| 3,295,169 | 1/1967 | Moslo | 239/533 X |
| 3,387,790 | 6/1968 | Luca | 239/533 X |
| 3,892,362 | 7/1975 | Gayfer | 239/533 |
| 3,941,540 | 3/1976 | Driscoll | 425/245 NS |

*Primary Examiner*—John J. Love
*Attorney, Agent, or Firm*—Kane, Dalsimer, Kane, Sullivan and Kurucz

[57] ABSTRACT

A nozzle to be connected between a conventional molding machine and a mold cavity for injecting molten resin of thermoplastics into a mold cavity where a gate at the front end of a cylinder of the nozzle opens and closes automatically according to the pressure of molten resin. A differential moving piston slidably disposed in the cylinder includes a front piston and a rear piston mounted on the front end and the rear end thereof respectively, a passage for molten resin axially drilled therethrough and a needle protruding forward from the front end of the front piston for mating with the gate according to the sliding movement thereof. A spring disposed in the cylinder pushes the differential moving piston forward to close the gate. Herein said front piston is larger in its effective area functioning as a piston head than that of said rear piston so that when the pressure of molten resin increases the differential moving piston slides backward to open the gate against the spring by the backward pushing differential force between the total pressure on the front piston and the total pressure on the rear piston.

11 Claims, 6 Drawing Figures

FIG. 1
FIG. 2
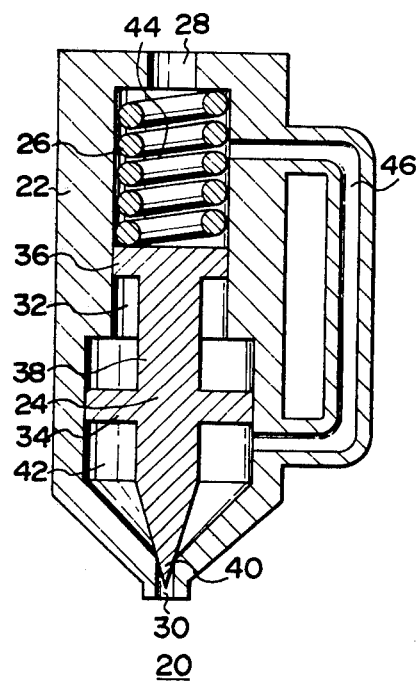
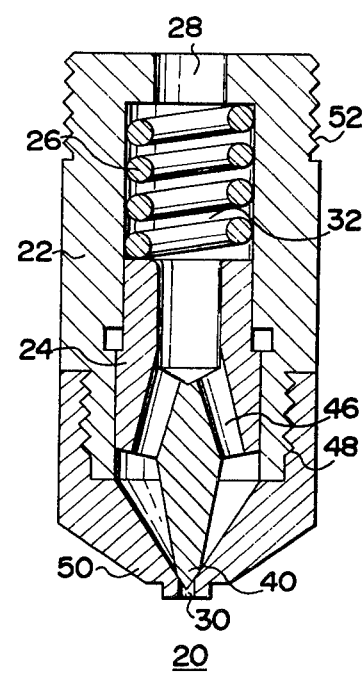

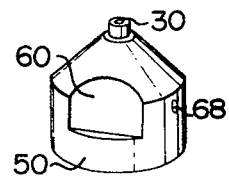
FIG. 5
FIG. 6
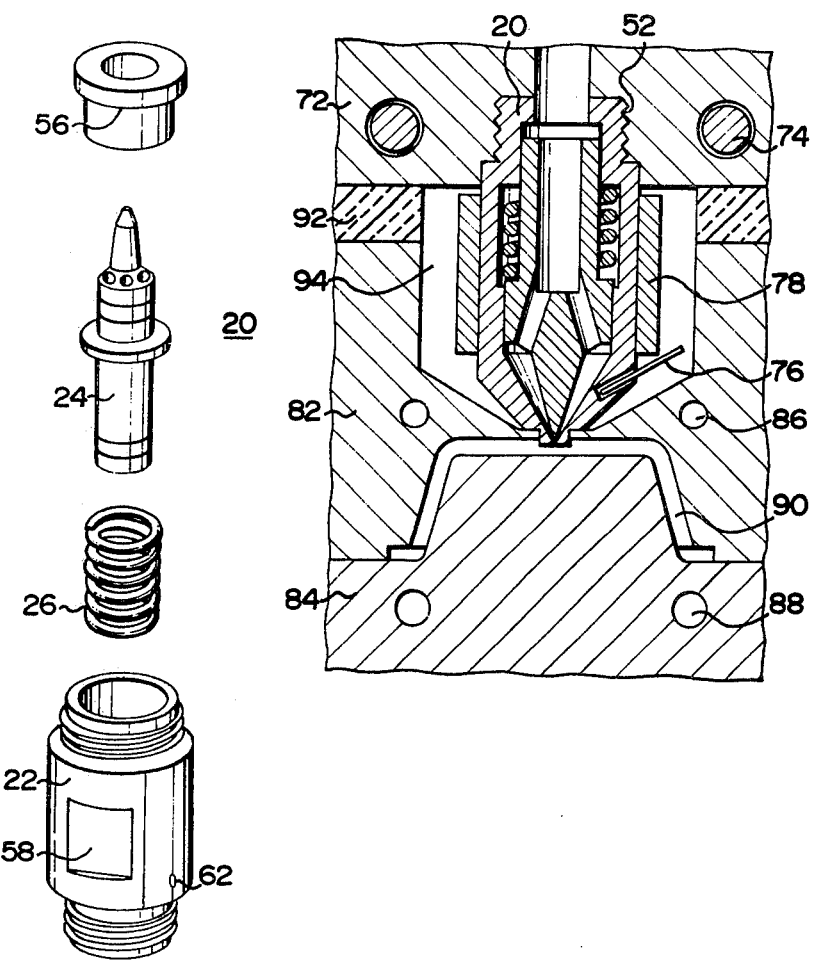

NOZZLE FOR INJECTION MOLDING OF THERMOPLASTICS

BACKGROUND OF THE INVENTION

1. Field of the Invention

This invention relates to an apparatus for injecting molten resin into a mold cavity, and more particularly to a plug-in type nozzle with a valve gate for runnerless and sprueless type molding of thermoplastic materials.

2. Description of the Prior Art

Hitherto, in the field of injection molding of thermoplastic materials, there has been no effective injection nozzle having a gate which opens and closes distinctively. With the conventional injection nozzle, molten resin often leaks from the gate causing drooling or stringing when the gate should close. Therefore in order to obtain product of good quality, extra parts such as runner or sprue are required for providing instantaneous injection or for disposing the leaked resin. Such molded product with runner or sprue needs additional finishing process of trimming or spotfacing. It is quite difficult to bring automation to these finishing process completely and inexpensively.

There have been various attempts to eliminate sprue or runner without success. There tried two kinds of runnerless or sprueless type injection molding apparatus, so-called heat gate type and valve gate type.

In the heat gate type, the resin around the gate is solidified or melted by controlling the temperature around the gate using cooling water or electric heater etc., so that the gate closes or opens. This type of apparatus requires precise temperature control and can not prevent leakage of resin from the gate causing drooling or stringing especially for resins with low viscosity such as nylon-6.

In valve gate type, a needle opens or closes the gate mechanically. This type of apparatus requires a complicated driving power such as oil pressure mechanism outside the nozzle in order to activate said needle valve. There have been attempts to eliminate such an external driving power by adopting a valve gate which works automatically by the pressure of molten resin. However this kind of valve gate requires a strong spring for resisting the high injection pressure of 500–5000 Kg/cm$^2$. Therefore the nozzle necessarily becomes so cumbersome that it is impossible to mold very small products precisely.

Nowadays several plug-in type injection nozzles have been developed for simplifying designing of the mold cavity. These plug-in type nozzles belong to either heat gate type or valve gate type. So plug-in type nozzles can not get rid of the above mentioned disadvantages either.

Thus, there has been no effective plug-in type, runnerless type or sprueless type injection molding nozzle, although there have been strong desires for an injection nozzle without the above mentioned disadvantages.

SUMMARY OF THE INVENTION

The present invention is directed towards an apparatus for providing runnerless type injection molding of thermoplastic materials without material loss to make all the material into product.

Another object of this invention is to provide an injection nozzle to be connected between a molding machine and a mold cavity without causing drooling or stringing.

Still another object of this invention is to provide a valve gate for injecting thermoplastic materials which works automatically only by the pressure of molten resin applied by a molding machine without any external driving power or without any external synchronous mechanism.

A further object of this invention is to provide a compact nozzle for injection molding of thermoplastic materials.

A still further object of this invention is to provide a standardized plug-in type nozzle which can be easily attached to any mold cavity and to any molding machine without laborious adjustment.

Yet another object of this invention is to provide a total system including the above mentioned nozzle adapted to be inserted into a mold cavity for molding effectively precise products of good quality.

Other objects, features and advantages of this invention will become apparent from the following description in conjunction with the accompanying drawings.

BRIEF DESCRIPTION OF THE DRAWINGS

FIG. 1 is the sectional view showing principle of the present invention;

FIG. 2 is the sectional view of the first embodiment of this invention;

FIG. 5 is the exploded view of the third embodiment of this invention; and

FIG. 6 is the partial sectional view of the third embodiment of this invention attached to a mold cavity taken along the axis of the nozzle.

DESCRIPTION OF THE PREFFERRED EMBODIMENTS

Figure 3:
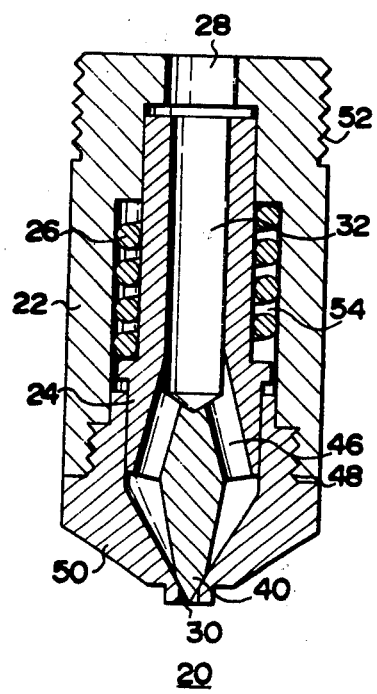
FIG. 3 is the sectional view of the second embodiment of this invention.

Reference is now made to the drawings wherein similar components bear the same reference numeral throughout the several figures.

FIG. 1 shows the principle of the present invention. An injection nozzle 20 is comprising of a cylinder 22, a differential moving piston 24 and a spring 26. In this description, the word 'front' and 'rear' are defined according to the flow direction of molten resin. The interior of the cylinder 22 forms a cylindrical piston chamber 32. An inlet 28 is drilled through the rear end of the cylinder 22. The inlet 28 is connected to a conventional molding machine which is not shown in FIG. 1 for introducing molten resin into the piston chamber 32. A gate 30 is drilled through the front end of the cylinder 22 along the axis of the cylinder 22. The gate 22 is connected to a mold cavity which is not shown in FIG. 1 for injecting molten resin. The differential moving piston 24 is disposed in the piston chamber 32 slidably in the axial direction of the cylinder 22. The differential moving piston 24 divides the piston chamber 32 into the front portion 42 and the rear portion 44. The front end of the differential moving piston 24 forms a front piston 34 and the rear end forms a rear piston 36. The both pistons 34 and 36 are connected tandem to each other with a piston rod 38. A needle 40 is protruding forward along the axis of the cylinder 22 from the front end of the front piston 34. So, when the differential moving piston 24 is in the front position of the sliding movement, the needle 40 couples with the gate 30. And when the differential moving piston 24 is in the rear position of the sliding movement, the needle 40 is apart from the gate 30. The front portion 42 of the piston chamber 32 and the rear portion 44 of the piston chamber 32 are interconnected with a passage 46 running out of the cylinder 22. The spring 26 is disposed in the rear portion 44 of the piston chamber 32 pressing the rear end of the rear piston 36 forward.

When molten resin is introduced from a connected molding machine through the gate 30, it fills the rear portion 44 of the piston chamber 32, the passage 46 and the front portion 42 of the piston chamber 32. The differential moving piston 24 receives two reversely directed forces at the same time. In other words, the rear piston 36 is pushed forward while the coaxially located front piston 34 is pushed backward. The pressure of molten resin applied on the front piston 34 is kept the same as the pressure of molten resin applied on the rear piston 36. Area of piston head of the front piston 34 is slightly greater than that of the rear piston 36. So when the pressure of molten resin higher than a predetermined value is applied by a molding machine, the difference of the said reversely directed forces works in the end to slide the differential moving piston 24 backward against the forwardly biasing spring 26. As a result the gate 30 opens automatically to inject the resin in the piston chamber 32 to the mold cavity. This injection continues with feeding new molten resin continuously from a connected mold cavity. And when pressure of molten resin decreases, the gate 30 closes automatically.

Careful consideration should be paid in determining the area of the front piston 34, the area of the rear piston 36 and the strength of the spring 26 in response to said predetermined pressure value for opening the gate 30. Herein, considering exact effective area functioning as the front piston 34 and the rear piston 36, the effective area functioning as the front piston 34 does not include the area of the needle 40 which is coupled with the gate 30, and the effective area functioning as the rear piston 36 does not include the area of the rear piston 36 in contact with the spring 26. These exceptional areas should be considered in designing the embodiments of the present invention even though they are almost negligibly small comparing with the total effective areas in most cases.

FIG. 2 shows the first embodiment of the present invention. The nozzle 20 is comprising of a cylinder 22, a differential moving piston 24 and a spring 26. The interior of the cylinder 22 forms a forwardly opened cylindrical piston chamber 32. An inlet 28 is drilled along the axis of the cylinder 22 through the rear end of the cylinder 22 for introducing molten resin from a molding machine to the piston chamber 32. A cone-shaped cylinder cap 50 is attached to the front end of the cylinder 22 with a screw 48 threaded both on the circumference of the front end of the cylinder 22 and on the inturned interior surface of the rear end of the cylinder cap 50. A gate 30 is drilled along the axis of the cylinder 22 through the front end of the cylinder cap 50 for injecting molten resin in the piston chamber 32 into a mold cavity not shown in FIG. 2. The differential moving piston 24 is disposed in the piston chamber 32 so as to slide along the axis of the cylinder 22. The differential moving piston 24 divides the piston chamber 32 into front portion and rear portion. According to the sliding movement of the differential moving piston 24, the gate 30 opens or closes in combination with the needle 40. A plurality of passages 46 are drilled through the differential moving piston 24 almost parallel to the axis of the cylinder 22 for interconnecting said front portion and said rear portion of the piston chamber 32. Molten resin supplied by a molding machine runs through the inlet 28, the passages 46 and the gate 30. A spring 26 is disposed in said rear portion of the piston chamber 32. The spring 26 pushes the differential moving piston 24 forward so that the needle 40 couples with the gate 30 usually. A screw 52 is threaded on the circumference of the rear end of the cylinder 22 for installing the nozzle 20 on a conventional molding machine which supplies molten resin so that plug-in type installation is obtained easily. In this embodiment, even though the differential moving piston 24 is a little different in its configuration from that of FIG. 1, this embodiment is fundamentally identical with that of FIG. 1 in its principle. That is, even though the differential moving piston 24 in FIG. 2 has no distinction between a front piston, a rear piston and a piston rod as defined in FIG. 1, the front surface of the differential moving piston 24 works as a front piston 34 in FIG. 1 and the rear surface works as a rear piston 36 in FIG. 1, because the diameter of the front surface of the differential moving piston 24 in FIG. 2 is slightly greater than that of the rear surface. In this embodiment, a compact nozzle 20 is obtained by disposing the passages 46 through the differential moving piston 24. While in FIG. 1, the passage 46 runs out of the cylinder 22. As mentioned, the cylinder cap 50 can be detached easily from the cylinder 22. So the differential moving piston 24 and the spring 26 are easily inserted in the piston chamber 32 in the assembling process of the nozzle 20. And the nozzle 20 can be overhauled also with ease.

FIG. 3 shows the second embodiment of the present invention. The nozzle 20 is comprising of a cylinder 22, a differential moving piston 24 and a spring 26. The interior of the cylinder 22 forms a forwardly opened cylindrical piston chamber 32. An inlet 28 is drilled along the axis of the cylinder 22 through the rear end of the cylinder 22 for introducing molten resin from a conventional molding machine to the piston chamber 32. A cone-shaped cylinder cap 50 is attached to the front end of the cylinder 22 with a screw 48 threaded both on the inturned interior surface of the front end of the cylinder 22 and on the circumference of the rear end of the cylinder gap 50. A gate 30 is drilled along the axis of the cylinder 22 through the front end of the cylinder cap 50 for injecting molten resin in the piston chamber 32 into a mold cavity not shown in FIG. 3. The cylinder cap 50 can be easily detached from the cylinder 22 for assembly and overhaul. The differential moving piston 24 is disposed in the piston chamber 32 so as to slide along the axis of the cylinder 22. The differential moving piston 24 divides the piston chamber 32 into front portion and rear portion. A needle 40 is protruding forward from the front surface of the differential moving piston 24. According to the sliding movement of the differential moving piston 24, the gate 30 opens or closes in combination with the needle 40. A plurality of passages 46 are drilled through the differential moving piston 24 almost parallel to the axis of the cylinder 22 for interconnecting said front portion and said rear portion of the piston chamber 32. Molten resin runs through the inlet 28, the passages 46 and the gate 30. This embodiment is also fundamentally identical with that of FIG. 1 in its principle as the first embodiment shown in FIG. 2. A screw 52 is threaded on the circumference of the rear end of the cylinder 22 for installing the nozzle 20 on a conventional molding machine. In this embodiment, location of a spring 26 is different from that of the first embodiment shown in FIG. 1. A spring 26 is disposed in an annular cavity 54 formed between the circumference of the differential moving piston 24 and the inturned interior surface of the piston chamber 32. And the spring 26 pushes the differential moving piston 24 forward on a flange mounted on the circumference of the middle of the differential moving piston 24. Therefore the spring 26 does not contact with molten resin, so that advantages as follows are obtained;

1. Speedy opening and closing of the gate is assured because the movement of the spring is never disturbed even when injecting resins with high viscosity.

2. Long lifetime of the spring is obtained.

3. It is easy to clean the nozzle when injecting other resins or resins with other colors.

Figure 4:
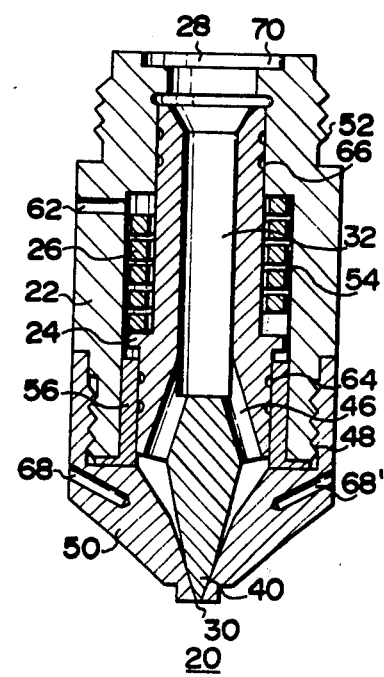
FIG. 4 is the sectional view of the third embodiment of this invention.

FIG. 4 and 5 show the third embodiment of the present invention wherein the nozzle 20 in FIG. 5 is illustrated upside down. The nozzle 20 is comprising of a cylinder 22, a differential moving piston 24, a spring and a ring 56. The interior of the cylinder 22 forms a forwardly opened cylindrical piston chamber 32. An inlet 28 is drilled along the axis of the cylinder 22 through the rear end of the cylinder 22 for introducing molten resin from a conventional molding machine to the piston chamber 32. A ring 56 with a flange on the circumference of its front end is disposed in the piston chamber 32. The circumference of the ring 56 except said flange is in contact with the inturned interior surface of the front end of the piston chamber 32. The rear surface of said flange is in contact with the front surface of said cylinder 22.

A cone-shaped cylinder cap 50 is attached to the front end of the cylinder 22 with a screw 48 threaded both on the circumference of the front end of the cylinder 22 and on the inturned interior surface of the rear end of the cylinder cap 50. A gate 30 is drilled along the axis of the cylinder 22 through the front end of the cylinder cap 50 for injecting molten resin into a mold cavity. The front surface of the flange of the ring 56 is in contact with the transversely flat surface of the cylinder cap 50 that is located inner than the screw 48, so that the axial movement of the ring 56 is cramped. The cylinder cap 50 can be easily detached from the cylinder 22 for assembly and overhaul. The circumference of the cylinder 22 and the cylinder cap 50 respectively forms a pair of notches 58 and 60 as shown in FIG. 5 for wrenching in assembly or overhaul. The differential moving piston 24 is disposed in the piston chamber 32 so as to slide along the axis of the cylinder 22. The circumference of the rear portion of the differential moving piston 24 is in slidable contact with the inturned interior surface of the rear end of the piston chamber 32. The circumference of the front portion of the differential moving piston 24 is in slidable contact with the inturned interior surface of the ring 56. The differential moving piston 24 divides the piston chamber 32 into front portion and rear portion, i.e. the front surface of the differential moving piston 24 defines said front portion and the rear surface defines said rear portion. The front surface of the differential moving piston 24 is a little greater in its effective area functioning as a piston head than that of the rear surface. A needle 40 is protruding forward along the axis of the cylinder 22 from the front surface of the differential moving piston 24. According to the sliding movement of the differential moving piston 24, the gate 30 opens or closes in combination with the needle 40. A six passages 46 are drilled through the differential moving piston 24 almost parallel to the axis of the cylinder 22. Molten resin runs through the inlet 28, the passages 46 and the gate 30. This embodiment is also fundamentally identical with that of FIG. 1 in its principle. An annular cavity 54 is formed between the inturned interior surface of said piston chamber 32, the circumference of the differential moving piston 24 and the rear end of said spring 56. The spring 26 is disposed in the annular cavity 54 around the circumference of the differential moving piston 24. The spring 26 applies forward force on a flange mounted on the circumference of the middle of the differential moving piston 24. The spring 26 has rectangular or square section which gives stronger bias than that of circular section. A screw 52 is threaded on the circumference of the rear end of the cylinder 22 for installing the nozzle 20 on a conventional molding machine which supplies molten resin. A vent hole 62 is drilled through the rear portion of the cylinder 22 in its circumferential direction for communication between the annular cavity 54 and the atmosphere in order to assure smooth movement of the differential moving piston 24 in the piston chamber 32. Channels 64 and 66 for lubricant are channeled on the circumference of both the front portion and the rear portion of the differential moving piston 24. Lubricant such as $MoS_2$ or graphite is applied to the channels 64 and 66, so that the lubricant stored in the channels 64 and 66 is supplied to the sliding surface between the ring 56 or the differential moving piston 24 and the cylinder 22 little by little for a long period of time. A pair of pits 68 and 68' are drilled on the opposite side of the circumference of the cylinder cap 50. A thermocouple not shown in FIGS. 4 and 5 can be inserted into the either pit 68 or 68' according to the configuration of mold cavity. Temperature around the gate 30 is measured by this thermocouple. An electric heater not shown in the FIGS. 4 and 5 is attached on the circumference of the nozzle 20. A temperature controlling circuit not shown in the FIGS. is connected between said thermocouple and said heater. Precise temperature control of resin in the nozzle 20 is obtained by controlling the electric current of the heater according to the temperature measurement by the thermocouple. The rear surface of the cylinder 22 around the inlet 28 is engraved to form a groove 70 for receiving a packing ring not shown in Figs. in order to prevent leakage of resin from the connecting part when installing the nozzle 20 to a molding machine. The packing ring can be any conventional annular shaped metal. The front end of the needle 40 is not pointed but filed for preventing from protruding outward from the gate 30 in its closed position. Diameter of the inlet 28 is smaller than the outer diameter of the differential moving piston 24 so that the differential moving piston 24 does not go backward more than necessary.

In the second embodiment shown in FIG. 3, the circumference of the front portion of the differential moving piston 24 is in contact with the inturned interior surface of the front portion of the cylinder cap 50. While in this embodiment shown in FIG. 4, a ring 56 is inserted and cramped between the front portion of the cylinder 22 and the cylinder cap 50. And the inturned interior surface of the ring 56 is in contact with the circumference of the differential moving piston 24. Therefore this embodiment has advantages as follows;
1. It is easy to obtain precise machining of the nozzle.
2. The nozzle works quite accurately.
3. It is easy to assemble or overhaul the nozzle.

FIG. 6 shows the nozzle 20 of the present invention attached to the manifold 72. Molten resin is introduced from a conventional molding machine through the manifold 72 into the nozzle 20. Heaters 74 placed in the manifold 72 hold the manifold 72 at high temperature. The nozzle 20 is fixed on the manifold 72 by a screw 52. Temperature of the nozzle 20 is measured by a thermocouple 76 inserted in the nozzle 20. Heater 78 is attached on the circumference of the cylinder 22 of the nozzle 20. Temperature controlling circuit not shown in the Figs. controls the electric current of the heater 78 according to the temperature measurement by the thermocouple 76. A mold or die is comprising of the upper part 82 and the lower part 84 either of which is cooled respectively by cooling pipes 86 and 88 supplying cooling water. Heat insulator 92 made of asbestos or other heat insulating materials is sandwiched between the manifold 72 and the upper part 82 of the mold. A mold cavity 90 in the shape of molded product is engraved between the upper part 82 and the lower part 84. The upper part 82 of the mold has a cavity 94 in which the nozzle 20 is received. And the gate of the nozzle 20 is connected to the mold cavity 90. When pressure of molten resin increases, the differential moving piston 24 of the nozzle 20 goes backward i.e. goes upward in FIG. 6 to open the gate 30 allowing the molten resin to flow through the gate into the mold cavity 90. The injected molded resin is then cooled and solidified in the mold cavity 90 to form a product. The molded product is taken out by dividing the mold into the upper part 82 and the lower part 84.

The present invention has the advantages as follows:
1. Being a runnerless type, this invention makes all the plastic material into the products without material loss of runner or flash. It conserves 30–50 % of plastic materials and shorten the cycle time of molding process comparing with the conventional runner types. As a result, this invention increases the total productivity of the injection molding system.
2. This invention, a runnerless type, eliminates such an additional process as trimming or spotfacing. Therefore it is possible to bring complete automation to molding process.
3. Being a valve gate type, the valve of the nozzle opens and closes correctly so that the flow of molten resin goes and stops distinctively. So it is easy to mold resins with high fluidity in its molten state, for example nylon-6. In any case, there is no leakage of molten resin from the gate causing drooling or stringing.
4. The gate of this invention opens or closes automatically according to the injecting pressure of molten resin applied by a conventional molding machine. Therefore this invention requires neither external driving power nor external synchronous mechanism to activate the gate. And if abnormal pressure increase occurs resulting from thermal decomposition of the resin etc., the nozzle will open automatically functioning as a safety valve.
5. The gate does not open until the injection pressure of molten resin in the cylinder becomes a predetermined value. So this invention gives high instantaneous injection rate of resin. The molten resin is injected into the mold cavity in very short period of time. This increases the quality of the molded products. And this is quite advantageous especially in molding thin-walled products.
6. The spring for pushing the differential moving piston need not be strong because the piston of this invention works by the differential force between two forces applied on the opposite side of the differential moving piston. And therefore the needle and the gate have long lifetime.
7. The passageway which introduces the molten resin to the gate runs through the differential moving piston longitudinally. Because of this smart structure, it is possible to obtain an extremely compact nozzle, for example 20 mm or less in length and 10 mm or less in diameter.
8. In this invention, it is possible to preset the temperature of each nozzle accurately especially when a plurality of nozzles are connected to one molding machine. So it is easy to mold plastic materials with narrow moldable temperature range. And this precise temperature adjustment increases the quality and the uniformity of the products.
9. Being a plug-in type nozzle, the designing and the manufacturing of the mold is accomplished with ease.

Thus, the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:
1. An improved plug-in type small nozzle adapted to be inserted into a mold cavity for injecting molten resin of thermoplastic into a cavity and for use in sprueless and runnerless types of multi-cavity molding processes comprising:
a cylindrical body having a cylindrical piston chamber therein open at the forward end and having an inlet at the rear end for introducing molten resin to said piston chamber;
a ring with a flange on the circumference of the front end disposed in said piston chamber, the outer surface of said ring except said flange in contact with the interior surface of the front end of the piston chamber, the rear surface of said flange in contact with the front surface of said cylinder;
a cone shape cylinder cap attached to the front end of said cylinder so that the ring is captured between the front surface of said cylinder and a transverse flat rear surface of said cylinder cap;
a gate at the front end of said cylinder cap opening along the axis of said cylinder for injecting molten resin in said piston chamber into the mold cavity;
a differential moving piston disposed in said piston chamber slidable along the axis of said cylinder for dividing said piston chamber into a front portion and a rear portion, the outer surface of the rear portion of the differential moving piston in axial slidable contact with the interior surface of the rear end of the piston chamber, the outer surface of the front end of the differential moving piston in axial slidable contact with the interior surface of said ring;
a front surface of said differential moving piston defining said front portion of the piston chamber;

a rear surface of said differential moving piston defining said rear portion of the piston chamber, the area of the rear surface being slightly smaller in the effective area functioning as a piston head than that of said front surface;

a needle protruding forward along the axis of said cylinder from said front surface of the differential moving piston, mating with said gate when said differential moving piston is located in the front position of the sliding movement and being apart from said gate when said differential moving piston is located in the rear portion of the sliding movement;

a plurality of annularly spaced passages through said differential moving piston substantially parallel to the axis of said cylinder interconnecting said front portion and said rear portion of the piston chamber for facilitating the application of the same pressure of molten resin on said front surface as on the rear surface to cause backward differential force between the total pressure applied on said front surface and the total pressure applied on said rear surface;

a spring disposed in the piston chamber to apply force to the differential moving piston for holding the differential moving piston in the front position of the sliding movement against said backward differential force until the pressure of molten resin becomes a predetermined value;

means on the rear end of said cylinder for attaching the cylinder to a molding machine;

the forward end of the cone shaped tip having a configuration adapted to permit direct connection to a mold cavity with the downward end forming part of the inner wall of the mold cavity.

2. The invention in accordance with claim 1 wherein the forward end of the cone shaped tip terminates in an annular projection with a central opening therethrough and has a flat forward surface, the annular projection and flat forward surface adapted to permit direct connection to the mold cavity with the flat surface forming part of the inner wall of the mold cavity.

3. The invention in accordance with claim 1 wherein the cone shaped cylinder cap has a threaded portion and the front end of the cylinder has a corresponding threaded portion positioned so that interengagement between the threaded portions of the cap and the cylinder attaches the cap to the cylinder.

4. The invention in accordance with claim 1 wherein the rear end of the needle has a transversely flat surface.

5. The invention in accordance with claim 1 wherein there are six annularly spaced passages through said differential moving piston, the rear end of said passages connected to each other to form a single passageway.

6. The invention in accordance with claim 1 wherein the spring disposed in the piston chamber has a square cross section.

7. The invention in accordance with claim 1 wherein the rear end of the cylinder has a threaded outer surface portion for facilitating attachment to a molding machine.

8. The invention in accordance with claim 1 wherein a vent hole is drilled transversely through the rear portion of the cylinder to provide communication between the interior of the cylinder and the atmosphere.

9. The invention in accordance with claim 1 wherein channels are provided on the outer surface of both the front portion and the rear portion of the differential moving piston for providing lubricant to the corresponding sliding surface gradually for a long period of time.

10. The invention in accordance with claim 1 wherein a pair of diametrically opposed pits are drilled in the wall of the cylinder cap for receiving a thermo couple for temperature measurement of molten resin around said gate.

11. The invention in accordance with claim 1 wherein a groove is channeled on the rear surface of the cylinder around the resin inlet for receiving a packing ring to prevent leakage of molten resin.

* * * * *